United States Patent
Pollmann

(10) Patent No.: US 9,085,235 B2
(45) Date of Patent: Jul. 21, 2015

(54) DISPLAY SYSTEM FOR A MOTOR VEHICLE

(71) Applicant: Bayerische Motoren Werke Aktiengesellschaft, Munich (DE)

(72) Inventor: Rainer Pollmann, Isen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 91 days.

(21) Appl. No.: 13/921,259

(22) Filed: Jun. 19, 2013

(65) Prior Publication Data

US 2013/0282226 A1    Oct. 24, 2013

Related U.S. Application Data

(63) Continuation of application No. PCT/EP2011/072758, filed on Dec. 14, 2011.

(30) Foreign Application Priority Data

Dec. 20, 2010  (DE) .......................... 10 2010 063 567

(51) Int. Cl.
*G01M 17/00* (2006.01)
*G06F 7/00* (2006.01)
*G06F 11/30* (2006.01)
*G07C 5/00* (2006.01)
(Continued)

(52) U.S. Cl.
CPC . *B60K 35/00* (2013.01); *B60Q 1/50* (2013.01); *B60K 2350/352* (2013.01)

(58) Field of Classification Search
CPC ...... B60Q 2900/30; B60Q 1/00; B60Q 3/004; B60Q 9/00; B60Q 11/00; B60K 2350/1064; B60K 37/02; B60K 2350/106; B60K 2350/35; B60K 28/08; B60K 28/10; B60K 37/06; G06F 19/00; G06F 17/00; G06F 3/00; G06F 7/00; B60R 2011/0082; B60R 1/00; B60R 2001/1215; B60R 1/12
USPC ......... 701/29.1, 22, 2, 70, 41, 23, 29.2, 1, 36, 701/400, 45, 103, 33.4; 340/435, 461, 905, 340/933

See application file for complete search history.

(56) References Cited

U.S. PATENT DOCUMENTS

| 5,757,595 | A | 5/1998 | Ozawa et al. |
| 6,534,884 | B2 * | 3/2003 | Marcus et al. ............... 307/10.1 |

(Continued)

FOREIGN PATENT DOCUMENTS

| AT | 507 337 A1 | 4/2010 |
| DE | 102 17 633 A1 | 11/2003 |

(Continued)

OTHER PUBLICATIONS

Corresponding International Search Report with English Translation dated Apr. 12, 2012 (six (6) pages).
(Continued)

*Primary Examiner* — Calvin Cheung
*Assistant Examiner* — Luis A Martinez Borrero
(74) *Attorney, Agent, or Firm* — Crowell & Moring LLP

(57) ABSTRACT

A display system is provided for a motor vehicle including a display and a control unit for controlling the display. The control unit is adapted to receive vehicle data via an interface and to represent the vehicle data on the display. The display is attached in an outer region of the vehicle body of the motor vehicle.

9 Claims, 3 Drawing Sheets

(51) Int. Cl.
*G06F 19/00* (2011.01)
*B60K 35/00* (2006.01)
*B60Q 1/50* (2006.01)

(56) References Cited

U.S. PATENT DOCUMENTS

| | | | | |
|---|---|---|---|---|
| 7,265,661 | B2 * | 9/2007 | Satou | 340/461 |
| 7,394,356 | B2 * | 7/2008 | Kumabe et al. | 340/436 |
| 7,696,864 | B2 * | 4/2010 | Dillon | 340/468 |
| 7,825,953 | B2 * | 11/2010 | Kato et al. | 348/148 |
| 2001/0026218 | A1 | 10/2001 | Schofield et al. | |
| 2002/0158583 | A1 | 10/2002 | Lys et al. | |
| 2003/0020880 | A1 * | 1/2003 | Knoll et al. | 353/13 |
| 2004/0059483 | A1 * | 3/2004 | Sukakura | 701/36 |
| 2005/0090946 | A1 * | 4/2005 | Pickering et al. | 701/2 |
| 2005/0280514 | A1 * | 12/2005 | Doan | 340/425.5 |
| 2006/0108874 | A1 * | 5/2006 | Kalb | 307/10.2 |
| 2006/0155429 | A1 * | 7/2006 | Boone et al. | 701/1 |
| 2007/0088481 | A1 * | 4/2007 | McCormick | 701/49 |
| 2008/0066355 | A1 * | 3/2008 | Misawa et al. | 40/541 |
| 2008/0106187 | A1 * | 5/2008 | Suzuki et al. | 313/503 |
| 2008/0117032 | A1 * | 5/2008 | Dillon | 340/426.1 |
| 2008/0211653 | A1 * | 9/2008 | Cope | 340/461 |
| 2009/0051294 | A1 | 2/2009 | Moning et al. | |
| 2009/0229153 | A1 * | 9/2009 | Suzuki et al. | 40/544 |
| 2009/0251920 | A1 * | 10/2009 | Kino et al. | 362/602 |
| 2009/0261957 | A1 * | 10/2009 | Kido | 340/435 |
| 2010/0230193 | A1 * | 9/2010 | Grider et al. | 180/65.27 |
| 2010/0238006 | A1 * | 9/2010 | Grider et al. | 340/425.5 |
| 2013/0263512 | A1 * | 10/2013 | Hus | 49/70 |

FOREIGN PATENT DOCUMENTS

| | | |
|---|---|---|
| DE | 103 44 651 B3 | 5/2005 |
| DE | 20 2005 019 957 U1 | 4/2006 |
| DE | 10 2005 026 807 A1 | 12/2006 |
| DE | 10 2007 039 677 A1 | 4/2009 |
| DE | 10 2008 016 375 A1 | 10/2009 |

OTHER PUBLICATIONS

German Search Report with English Translation dated Mar. 21, 2011 (nine (9) pages).

* cited by examiner

DISPLAY SYSTEM FOR A MOTOR VEHICLE

CROSS REFERENCE TO RELATED APPLICATIONS

This application is a continuation of PCT International Application No. PCT/EP2011/072758, filed Dec. 14, 2011, which claims priority under 35 U.S.C. §119 from German Patent Application No. 10 2010 063 567.7, filed Dec. 20, 2010, the entire disclosures of which are herein expressly incorporated by reference.

BACKGROUND AND SUMMARY OF THE INVENTION

The present invention concerns a display system for a motor vehicle.

A known display device includes a programmable display matrix for a decorative molding of the vehicle door, with which characters and symbols can be represented. A display device of this type is known from DE 10 2008 016 375 A1.

It is the object of the present invention to provide a display system for a motor vehicle which can easily convey relevant vehicle data to a user who is not in the motor vehicle.

This and other objects are achieved by a display system for a motor vehicle having a display and a control unit for controlling the display, which control unit is adapted to receive vehicle data via an interface and to represent the vehicle data on the display. The display is mounted on an outer area of the body of the motor vehicle. Here, "outer area" means an area outside of the interior of a passenger compartment.

The outer area of the body can be seen easily by a person who is outside of the motor vehicle.

Due to this, a person, e.g. before/during entering, during/after exiting, before/during/after loading, or before/during/after performing maintenance work, can easily read motor vehicle data without that person having to assume a position within the vehicle, e.g. the position of the driver.

The control unit can receive the vehicle data by way of the interface via cable but also without cable. A representation of the vehicle data on the display by the control unit can be rendered via characters or graphical symbols. The interface can be a component of the display system.

Vehicle data can be any data which are from the motor vehicle and can be provided by the vehicle, such as vehicle information or vehicle status data. Vehicle information means, for example, an indication of a manufacturer, a vehicle type, an owner, technical data, and so on.

According to a further development of the invention, the display system includes a switching device which serves for switching the display system. The switching device can be actuated by releasing a vehicle lock mechanism and/or by moving a movable body element.

The switching device of the display system can use a switching device already present in the motor vehicle for other purposes, or can include, a switching device especially intended for the display system, whose switching information can be used by the control unit for the switching on and off of the display or the control unit itself.

The switching device can be adapted to switch off the display system in a locking position of the vehicle closing mechanism. The switching device can also be adapted to switch on the display system in a release position of the vehicle closing mechanism.

Alternatively or as an additional condition, the switching device can also be adapted to switch off the display system in a closed position of the movable body element and to switch on the display system in an open position of the movable body element.

It is also possible that the display system is switched on if the vehicle closing mechanism is released, but is switched off once again on subsequent closing of a movable body element, although the vehicle closing mechanism is not in the locking position.

Thus, the display system saves energy because it is only in operation when the display is justified by vehicle data.

According to an additional aspect of the invention, the control unit is adapted in such a manner that it can receive and represent, i.e. visualize, the vehicle status data.

Vehicle status data are of particular interest to a person who is not in the vehicle body because these data enable immediate action without the person having to be in the motor vehicle or having to get into the motor vehicle.

For example, the vehicle status data can indicate the state of closure of body apertures. The state of closure can, for example, mean a display to the effect that a body aperture is still not closed such as a trunk lid being in an open state. Thus, the person can take countermeasures and close the body aperture. The person can act before she/he assumes a position in the vehicle or after she/he has left the vehicle.

A body aperture in the sense of the invention can be an aperture which is an open window, an open roof, or an open movable body element.

Furthermore, the vehicle status data can relate to the range of the motor vehicle. Thus, a person can, for example, be informed even before getting into the vehicle of whether the range is sufficient for the planned trip.

Furthermore, the vehicle status data can be data regarding the level of filling with operating fluids, such as, for example, an oil level, a window cleaning fluid level, a coolant level, and a tire air pressure. Thus, even before getting into the vehicle the driver has the ability to determine the filling levels of operating fluids as well as their deviation from a theoretical status and to take countermeasures in order to restore the theoretical status.

Furthermore, the vehicle status data can relate to the level of charge in a battery, in particular in an electric vehicle.

Furthermore, the actual load of the motor vehicle can be displayed as vehicle status data, whereby, for example, during a loading process of the motor vehicle it can be displayed to a person whether a permissible or recommended maximum load has already been reached.

Furthermore, the display system described above can display all the aforementioned vehicle status data and additional vehicle data/vehicle status data simultaneously or in sequence in different views.

In an additional development according to the invention, the display of the display system is disposed in a lockable access area of the body. In particular the lockable access area in a closed state is covered by a movable body element and in an open state is freely visible from outside the body.

Thus, the display is disposed in an area protected with respect to environmental conditions and external mechanical stress. Furthermore, the vehicle data are thus not visible to everyone, but rather only to persons who are authorized to open the movable body element.

Movable body elements in the sense of the present invention can be vehicle doors such as a passenger door, a driver door, or a rear door, loading hatches such as a trunk lid, machinery lids such as an engine hood, supply flaps such as a fuel tank flap, and so on.

The lockable access area can be an entrance area of an opened door of the motor vehicle. In particular the display can be disposed on a lateral sill. Furthermore, the lockable access area can be a loading area of an opened loading hatch. In particular, in this case the display can be disposed on a loading sill. Furthermore, the lockable access area can be a body element in a machinery compartment behind a machinery flap.

The above-described display system according to the invention can furthermore be individually programmable. The programming can, for example, be done by one person via an input system such as an on-board computer.

Furthermore, the above-described display system according to the invention can be embodied so that it can be operated by touching the display, where the display has a touch-sensitive surface. Thus, a person can change the displayed information with regard to vehicle data so that, for example, other vehicle data are displayed.

The above-described extensions of the present invention can be combined with one another arbitrarily.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
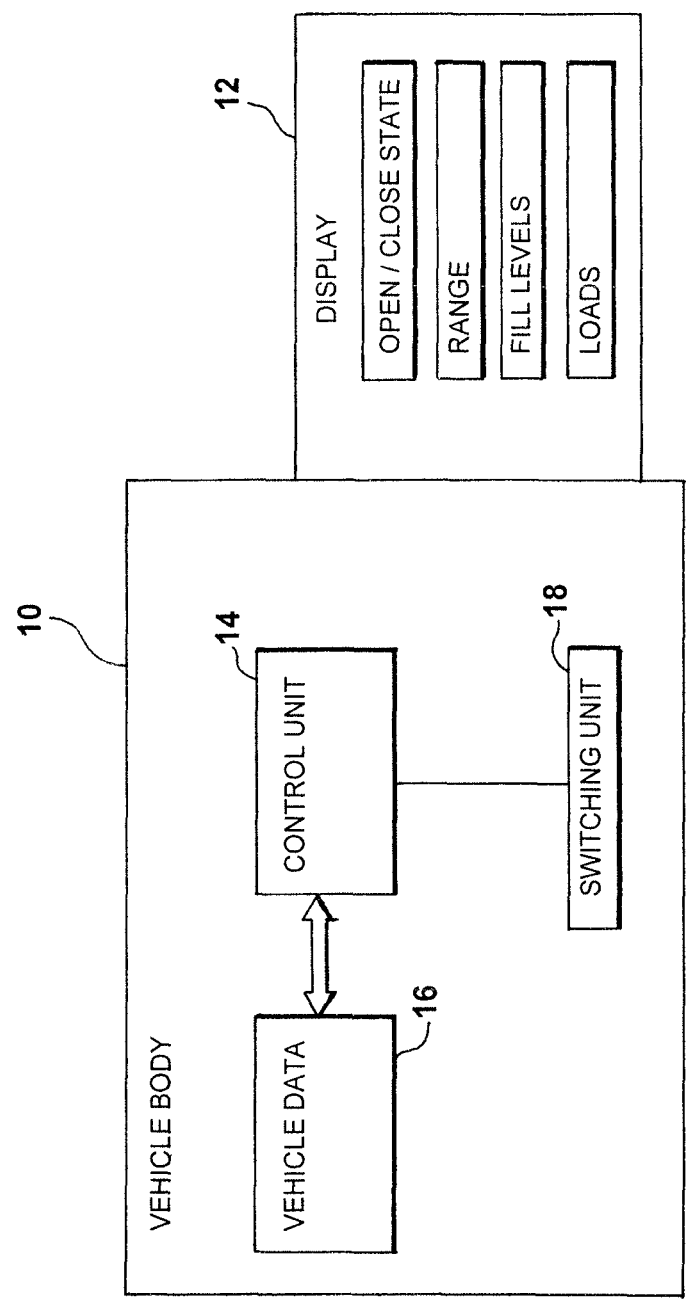
FIG. 1 is a generic block diagram illustrating an exemplary control unit and display for a motor vehicle.

FIG. 1 is a generic block diagram illustrating a vehicle body 10 on which a display 12 of a display system is mounted in an outer area of the vehicle body. A control unit 14 is operatively configured to control the display 12. The control unit 14 receives vehicle data 16 via an interface, which can be wired or wireless. A switching unit 18 is operatively coupled with at least one of the control unit 14 and display 12 for switching the display system.

Figure 2:
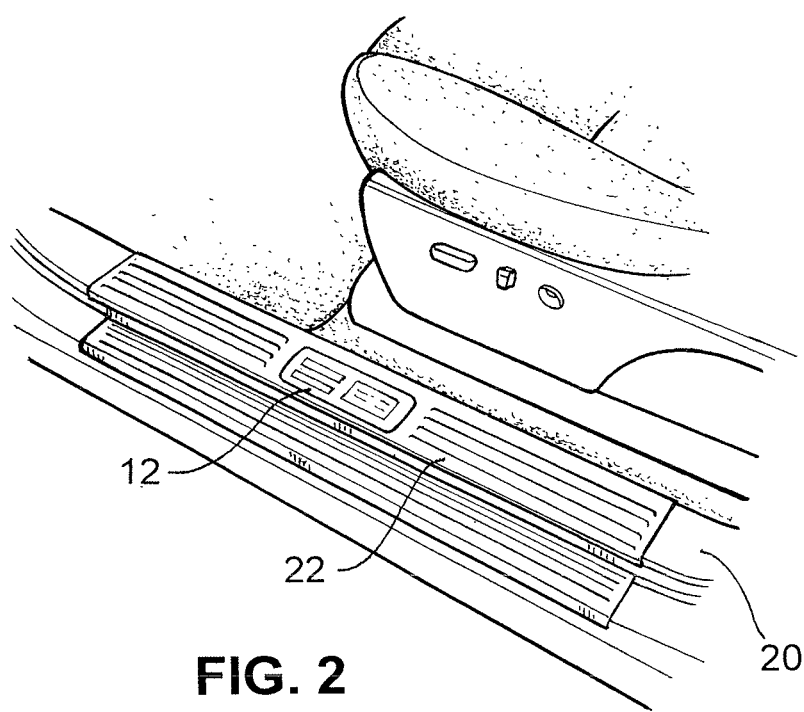
FIG. 2 is a perspective view of a first exemplary embodiment wherein the display is arranged on a driver door body sill.

According to a first exemplary embodiment shown in FIG. 2, the display 12 of a display system is disposed and fastened in a passenger motor vehicle on a driver door body sill 20 which forms an entrance area according to the invention. In particular, the display 12 is mounted on the body sill at a place which can be seen by opening the driver door and is easily visible from above by a driver who has opened the driver door before getting in. The display is disposed at a position where a scuff plate 22 or protective panel is customarily fastened on the body sill 20. In particular, the display 12 is disposed at a position at which lettering indicating the manufacturer and/or the vehicle model is customarily found on the scuff plate. The display of this first embodiment example is integrated in the scuff plate, which scuff plate is mounted on the body sill to protect it.

The display is controlled via the control unit which displays, i.e. represents, certain vehicle status data on the display. The control unit receives the vehicle status data from the vehicle via an interface. The vehicle status data are requested or received by the control unit without actuating an ignition or an on-switch of the passenger motor vehicle. This means that the driver does not yet have to be in the driver position, i.e. the vehicle seat, and also a process for starting the vehicle such as inserting a key, turning/pressing a key, actuating a start switch, etc. does not yet have to have been initiated in order to provide a display of vehicle status data on the display.

If all the vehicle status data are in a theoretical (normal or acceptable) range, the control unit issues a corresponding message on the display, such as, e.g. "Check Control OK." Furthermore, the control unit displays the range of the vehicle on the basis of the level of filling with fuel and/or the level of charge in the battery, as, for example, "Range 150 km." If a loading hatch or a machinery lid, such as, for example, a tailgate or an engine hood, is not properly closed, the control device issues a corresponding message on the display, such as, e.g. "Tailgate open." Furthermore, when certain operating fluids have fallen below a minimum level of filling, the control device displays, e.g., "Refill motor oil" or "Refill window cleaning fluid."

Furthermore, when the driver gets out of the vehicle the control unit visualizes on the display information relating to vehicle status data after the driver switches off the ignition of the vehicle, actuates an off-switch of the vehicle, or has removed the key. For example, if all the vehicle state data are in the theoretical range, then the display displays "Check Control OK." Alternatively, if no relevant vehicle status data are to be reported the control unit can switch the display over to an arbitrary rest mode display, which, for example, indicates the manufacturer or the vehicle model. If a window or a sunroof is open, the control unit issues the message on the display "Window open" or "Sunroof open."

The display is switched on by the control unit with an opening of the driver door and is switched off with a closing of the driver door. For this the data of the corresponding sensor technology on the doors or the door closing device are recorded by the control unit.

Figure 3:
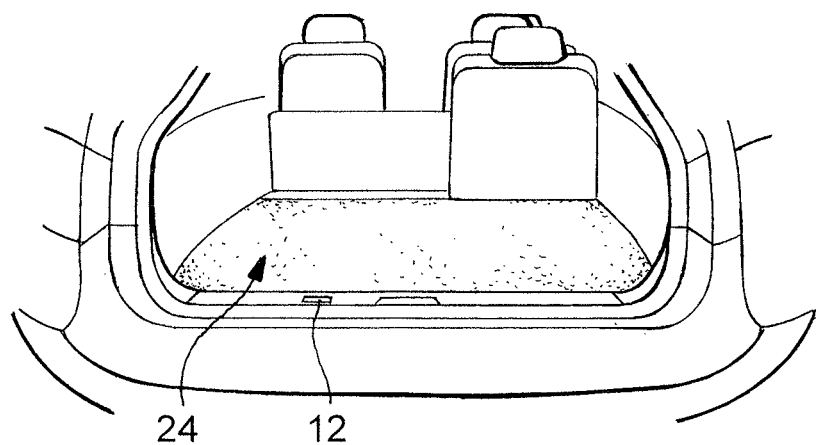
FIG. 3 is a perspective view of a second exemplary embodiment wherein the display is arranged in a loading area of a tailgate or trunk lid.

In a second exemplary embodiment shown in FIG. 3, the display 12 of a display system according to the invention is arranged in the loading area 24 of a tailgate or a trunk lid. In particular, the display 12 is disposed on a loading sill of a cargo bay, the loading sill being covered by the tailgate when it is closed. The display is integrated in the jacketing of the loading sill and in a manner such that it is clearly visible to the person who is loading or unloading.

The control unit of the second exemplary embodiment has the same functionality as that of the first exemplary embodiment and can thus display the same vehicle status data on the display as in the first embodiment. Furthermore, the control unit can display on the display information relevant to loading, such as, for example, a weight of the load, information concerning how much weight can still be loaded until the permissible total weight is reached, or whether the permissible total weight has been exceeded.

The display of the second embodiment example is activated as soon as the tailgate is opened, which is detected by the control unit via a corresponding sensor technology on the tailgate or on its closing mechanism. The display is deactivated/switched off as soon as the tailgate is closed.

Figure 4:
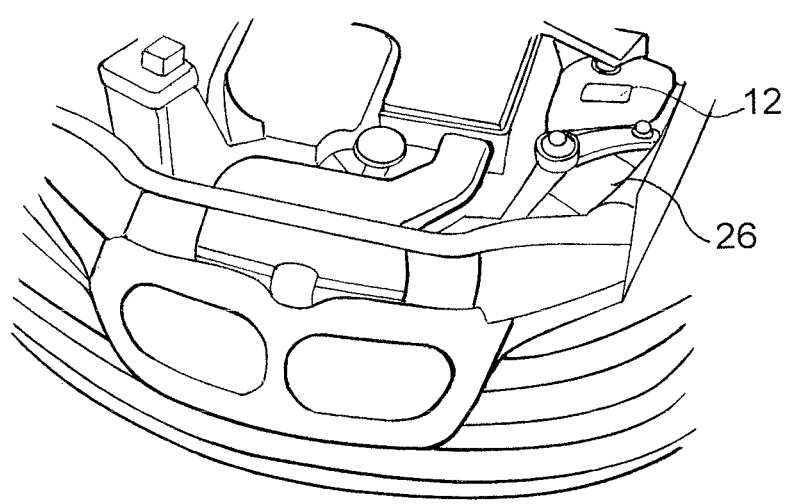
FIG. 4 is a perspective view of a third exemplary embodiment wherein the display is arranged within an engine compartment in an area of a suspension strut support.

In a third exemplary embodiment shown in FIG. 4, the display 12 of the display system according to the invention is disposed within an engine compartment 26, which constitutes a machinery compartment, on the body of the motor vehicle. The display 12 is, for example, mounted in the area of the suspension strut support and is covered and not visible in the closed state of an engine hood, which is a machinery lid according to the invention. The functionality of the display system of the third exemplary embodiment is similar to that of the first and second embodiments. In contrast to the first and second embodiments, the display of the third embodiment example is activated by a release of the engine hood and is deactivated by a locking of the engine hood. Furthermore, the display system of the third embodiment displays only vehicle status data which are relevant to a person who is opening the engine hood. Among these data are the levels of filling with operating fluids which can be refilled in the area of the engine compartment, e.g. a motor oil level, a window cleaning fluid level, or a coolant level. Furthermore, maintenance-specific vehicle status data are specified, such as, for example, with regard to a change of oil, a change of an oil filter, a change of brake fluid, a change of a timing belt, etc. and in fact in regard to a past maintenance or a past change or a recommended future maintenance or a recommended future change.

The display system of the first, second, and third embodiments can also be used in combination in a motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
a vehicle body having an outer area;
a display system for the motor vehicle, the display system comprising:
   a display mounted on the outer area of the vehicle body;
   a control unit coupled with the display and being operatively configured to control the display, the control unit receiving vehicle data via an interface and controlling the display to represent the vehicle data on the display in the outer area of the vehicle body;
a switch operatively configured to turn on and turn off the display system, wherein
the switch is configured to turn off the display system in a locking position of at least one of a vehicle closing mechanism or a closed position of the movable body element,
the switch is further configured to turn on the display system in a release position of the vehicle closing mechanism or in an open position of the movable body element, and
the display is arranged in a lockable access outer area of the vehicle body, in which the lockable access outer area is covered by a movable body element in a closed state and is visible from outside the vehicle body in an open state.

2. The motor vehicle according to claim 1, wherein the control unit is configured to receive vehicle status data and to control the display to display the vehicle status data.

3. The motor vehicle according to claim 2, wherein the vehicle status data are indicative of a state of closure of vehicle body apertures.

4. The motor vehicle according to claim 2, wherein the vehicle status data are indicative of a range of the motor vehicle, a filling level of operating fluids of the motor vehicle, a level of charge in a battery of the motor vehicle, and/or a load of the motor vehicle.

5. The motor vehicle according to claim 1, wherein the lockable access outer area is an entrance area of an opened motor vehicle door.

6. The motor vehicle according to claim 1, wherein the lockable access outer area is a loading area of an opened loading hatch.

7. The motor vehicle according to claim 1, wherein the lockable access outer area is a machinery compartment of the motor vehicle located behind a machinery flap.

8. The motor vehicle according to claim 1, wherein the display system is individually programmable.

9. The motor vehicle according to claim 1, wherein the display system is operatively configured as a touch panel display.

* * * * *